J. S. Mason,
Corn Planter,
No. 82,137.      Patented Sept. 15, 1868.

Witnesses
W. C. Ashkettle
Wm. A. Morgan

Inventor
J. S. Mason
per Munn & Co.
Attorneys

United States Patent Office.

JOHN S. MASON, OF COAL RUN, OHIO.

Letters Patent No. 82,137, dated September 15, 1868.

---

IMPROVEMENT IN COMBINED CORN-PLANTER AND CULTIVATOR.

---

The Schedule referred to in these Letters Patent and making part of the same.

---

TO ALL WHOM IT MAY CONCERN:

Be it known that I, JOHN S. MASON, of Coal Run, in the county of Washington, and State of Ohio, have invented a new and improved Combination of Corn-Planter and Cultivator; and I do hereby declare that the following is a full, clear, and exact description thereof, which will enable those skilled in the art to make and use the same, reference being had to the accompanying drawings, forming part of this specification.

This invention relates to a new and useful combination of a corn-planter and cultivator; and it consists in a peculiar construction and arrangement of the same, as hereinafter fully shown and described, whereby the device may, with the greatest facility, be readily converted from a corn-planter into a cultivator, and vice versa, and the device constructed at a very moderate cost.

In the accompanying sheet of drawings—

Figure 1:
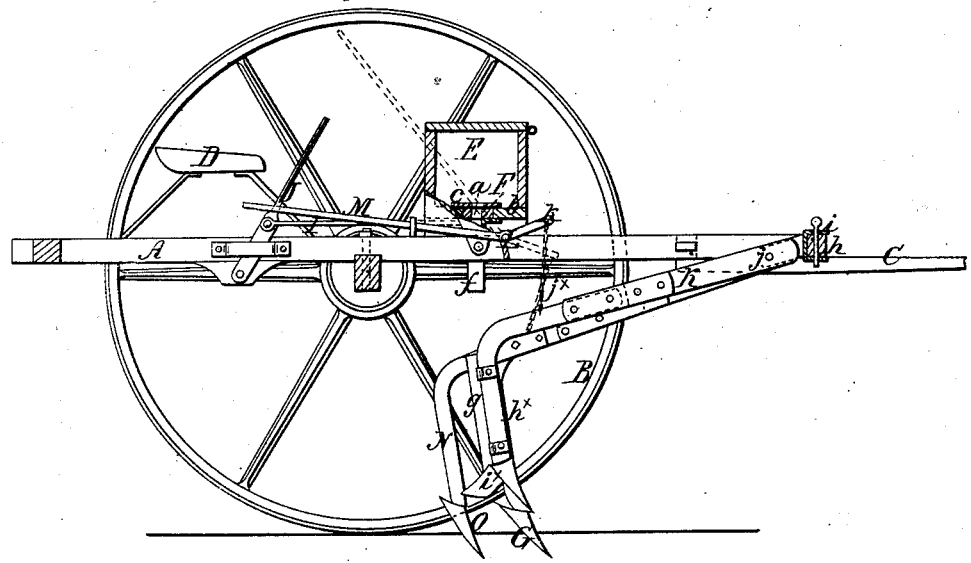
Figure 2:
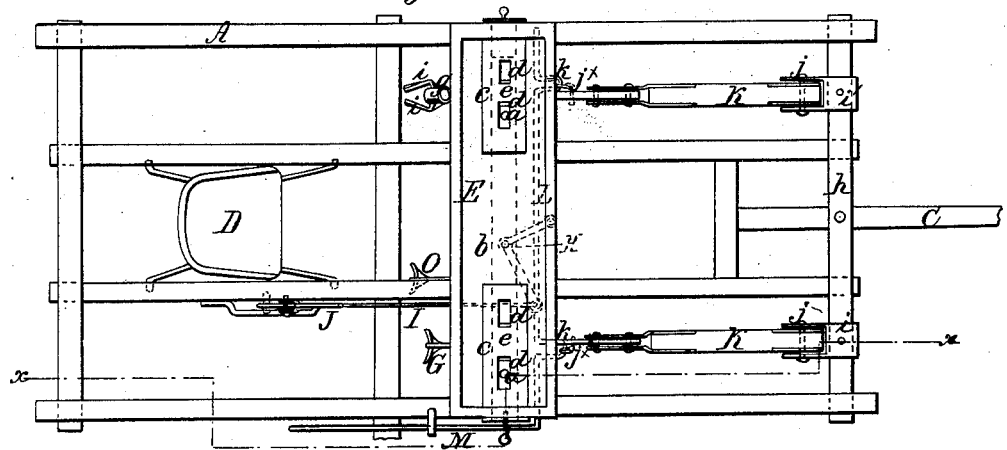

Figure 1 is a side sectional view of my invention, taken in the line $x\ x$, fig. 2.

Figure 2, a plan or top view of the same.

Similar letters of reference indicate corresponding parts.

A represents a rectangular frame, which is mounted on two wheels, B B, and has a draught-pole, C, attached, and a driver's seat, D, upon it at the rear of the wheels B.

E is a seed-box, which is placed transversely on the frame A, in front of the axle of the wheels B, and extends the whole width of the frame.

In the bottom of this seed-box there is fitted longitudinally a sliding bar, F, having a hole, $a$, made in it near each end, and on the bottom, $b$, of the seed-box, near each end, there is secured a plate, $c$, each having two openings, $d\ d$, made in it, one near each end, and a cut-off, $e$, at the centre, said cut-offs being directly over discharge-spouts, $f$, through which the seed passes into flexible tubes, (not shown,) which tubes conduct the seed into tubes, $g$, attached to the standards $h$ of the furrow-shares G.

The bar F is operated by hand through the medium of a bent lever, H, which is connected by a rod, I, with a hand-lever, J, the latter being within convenient reach of the driver's seat D.

The bent lever H is shown by dotted lines in fig. 2.

The holes $a$ in the sliding bar F are filled with seed as they come in line with the openings $d\ d$ in the plates $c$, the seed being discharged as the holes come in line with the tops of the discharge-spouts $f$.

To the front cross-piece, $h$, of the frame A there are attached two clips, $i\ i$, to which the front ends of two plow-beams, K K, are connected by joints $j$, which admit of the beams rising and falling in vertical planes.

The rear parts of these beams are of metal, and they are curved so as to form the standards $h$, which have the furrow-shares G at their lower ends, covering-shares, $i^\times$, being attached to said standards just above the shares G.

Each beam K is connected, by a chain, $j$, to a crank, $k$, on a shaft, L, and this shaft has a lever, M, at one end of it, which, like the lever J, is within convenient reach of the seat D.

The shares G are raised out of the ground by depressing the lever M, and lowering their work by raising it.

In using the device as a cultivator, supplemental share-standards, N, having shares, O, at their lower ends, are attached to the beams K.

This implement may be used equally well either as a corn-planter or cultivator, and may be constructed at a moderate cost.

I claim as new, and desire to secure by Letters Patent—

The plow-beams K K, attached to the frame A by joints $j$, in connection with the standards $h$ and covering-plates $i^\times$, crank-shaft L, to the cranks $k$ of which the beams are connected by chains, and the lever M at one end of the shaft L, substantially as and for the purpose specified.

JOHN S. MASON.

Witnesses:
RALPH STARLIN,
R. LANG.